April 8, 1930.  J. M. BOSCARDIN  1,753,688
TIRE MENDER
Filed Aug. 2, 1928
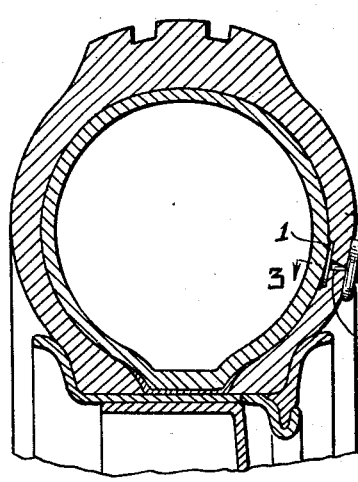
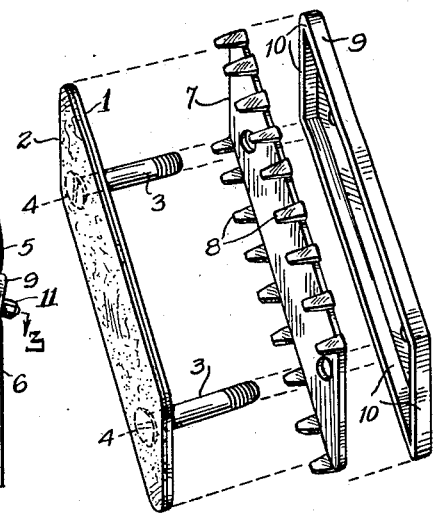
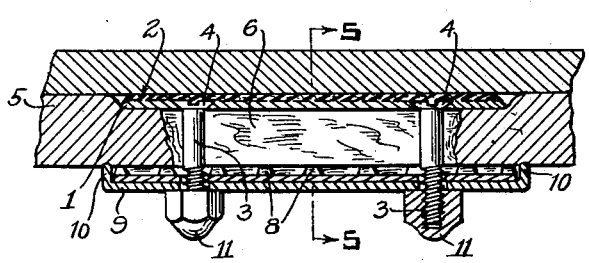
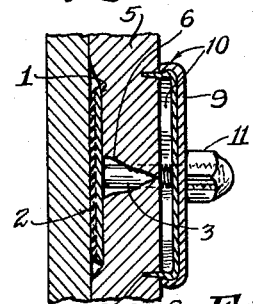
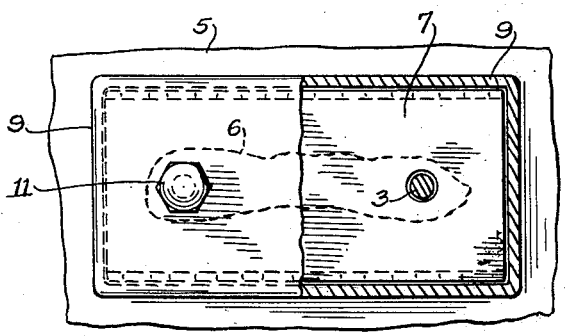
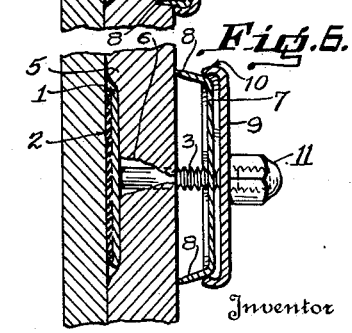
Inventor
John M. Boscardin
By Mason Fenwick & Lawrence
Attorneys Patented Apr. 8, 1930

1,753,688

UNITED STATES PATENT OFFICE

JOHN M. BOSCARDIN, OF CANAAN, CONNECTICUT

TIRE MENDER

Application filed August 2, 1928. Serial No. 297,051.

This invention relates to a tire mender or improved blow out patch.

The principal object is to provide a mechanical device whereby the side walls of a tire may be held in relatively closed position when pressure is exerted against the side walls upon the inflation of the inner tube.

Another object is to provide a tire mender with an outside cover plate that will serve to keep the dust and dirt out of the device. At the same time, the cover plate serves to force the teeth on a lower plate into the tire and prevent the spreading of the teeth when pressure is exerted from within. The cover plate also serves to limit the depth to which the teeth may be forced in the tire.

Other objects will be shown in the specification and drawings.

At the present time where a blow out patch is used, there is no attempt made to prevent the walls of the tire adjacent the blow out or cut from expanding under pressure.

The blow out patch may serve as a means for preventing the inner tube from extending through the cut or blow out, and at the same time, serve to protect the surface of the inner tube. By the use of the device described herein, the side walls adjacent the rupture or cut are prevented from stretching, thus saving the general tire structure, and at the same time, more direct and positive action is obtained.

In the drawings:

Figure 1 is a section of a tire showing the tire mender in position;

Figure 2 is a perspective of the various parts constituting the tire mender showing the various parts separated;

Figure 3 is a section taken through a tire and tire mender showing the tire mender in place;

Figure 4 is a top plan with a portion of the cover plate broken away;

Figure 5 is a section taken along line 5—5 of Figure 3; and

Figure 6 is a section similar to Figure 5 showing the tire mender before it has been forced into the tire as shown in Figure 5.

Referring to the drawings in which similar numerals designate like parts:

Numeral 1 refers to a base plate formed of metal with a backing of soft material 2, such as rubber.

Projecting through the base plate 1 are screw members 3, whose heads 4 are countersunk in the base plate 1 and are further protected by a layer of soft material 2. Adjacent the base plate 1 is a section of the usual tire 5 showing a rupture 6. The screw members 3 pass through the tire 5 and secure a plate 7 in alinement with base plate 1 and on the outside of the tire 5. Along the edge of plate 7 are teeth 8, at an angle to the plate 7. On top of the plate 7 is a cover plate 9 having flanges 10 which extend around the plate 7 on all sides. Nuts 11 or other suitable securing means, bear against the cover plate 9 and afford means for drawing the base plate 1 securely against the tire 5 which in turn is forced against the plate 7 and teeth 8.

It will be noted that the base plate 1 is smaller than the plate 7 and may be forced up within the teeth 8 so as to bear against the tire and indirectly against the plate 7. This is highly desirable as it permits a much closer contact, and at the same time forces the teeth 8 securely into the tire 5.

As actually used upon a tire having a blow out or a rupture in the side walls, a base plate 1 will be placed on the inside of the tire opposite the rupture. The screws will then be forced in the tire preferably at points where there is a rupture or abrasion. The plate 7 is then placed upon the screws with a cover plate 9 on top of the plate 7. It will be noted, as shown in Figure 6 that the teeth 8 project at an acute angle from the plate 7 and that the cover plate 9 does not fit over the plate 7, but merely rests against the same. Upon pressure being exerted due to the tightening of the nut 11, the cover plate 9 will be forced over the plate 7, and due to the flanges 10 extending around the plate 9, the teeth 8 will be forced inwardly at the same time drawing the side walls adjacent the rupture closer together until when the cover plate 9 fits snugly over the plate 7, the teeth 8 will be firmly imbedded in the tire and at approximately a right angle to the plate 7.

The cover plate 9 serves to limit the movement of the teeth 8 inwardly and as soon as the flange 10 comes in contact with the casing, it will serve as a stop. The cover plate 9 further serves to prevent the spreading of the teeth 8 when the tire is filled with air. Again, flange 10 affords a very convenient method of removing the plate 7 as the two will be locked together and a screw driver or similar tool may be inserted under the flange 10 and thus very easily remove the plate 7 from the tire. It will be noted that upon the teeth 8 being forced inwardly by the flange 10, a shoulder will be formed securely holding the flange 10 in place, and locking the plates 9 and 7 together.

As soon as the plate 7 has been forced into position by the plate 9, the base plate 1 will be forced upwardly, and since it is smaller than either of the other plates, it will have a tendency to seat within the plate 7. This action will result in a flush surface on the inside of the tire and overcomes one of the very common troubles, where a boot or patch is used, namely, of such article forming an obstruction within the tire which may pinch or wear against the tube causing a deflation of the tire. To further guard against any such contingency, the metal plate 1 is protected with a coating of rubber or other soft material.

Having thus described my invention, what I claim is:

1. A tire mender comprising a base plate, a second plate secured to said base plate, said second plate having teeth angularly disposed to said plate, a cover plate adjacent said second plate, said cover plate having a flange extending around its edges and overlapping said second plate, securing means passing through all the mentioned plates, for drawing the teeth on said second plate within the flange on said cover plate.

2. A tire mender comprising a base plate, a second plate, said second plate having teeth angularly disposed to said second plate, a cover plate adjacent said second plate, said cover plate having a flange extending around its edges and overlapping said second plate, means for securing said plates together and for drawing the teeth on said second plate within the flange on said cover plate.

In testimony whereof I affix my signature.

JOHN M. BOSCARDIN.